United States Patent [19]

Muta

[11] 4,216,738
[45] Aug. 12, 1980

[54] METHOD OF RENEWING WATER PIPE, INCLUDING COATING THEREOF, AND APPARATUS THEREFOR

[75] Inventor: Natsuo Muta, Fukuoka, Japan

[73] Assignee: Kabushiki Kaisha Kankyo Kaihatsu, Fukuoka, Japan

[21] Appl. No.: 957,860

[22] Filed: Nov. 6, 1978

[30] Foreign Application Priority Data

Dec. 21, 1977 [JP] Japan .................. 52-154882

[51] Int. Cl.$^2$ .......... B05D 7/22; B05C 11/00; B05B 13/06; B05C 5/00
[52] U.S. Cl. ........................ 118/72; 134/226; 15/104.05; 118/306; 118/317; 118/DIG. 10; 427/230; 427/235; 427/239
[58] Field of Search .............. 118/306, 317, DIG. 10, 118/72; 15/104.05; 427/230, 235, 239; 134/22 C

[56] References Cited

U.S. PATENT DOCUMENTS

| | | | |
|---|---|---|---|
| 3,106,491 | 10/1963 | Leibner | 118/306 X |
| 3,164,491 | 1/1965 | Brockett et al. | 118/306 X |
| 3,457,895 | 7/1969 | Mukai | 118/306 X |

*Primary Examiner*—Michael R. Lusignan
*Attorney, Agent, or Firm*—Sandler & Greenblum

[57] ABSTRACT

A method of cleaning and renewing sections of pipe is disclosed wherein the flow of fluid through the pipe is shut off and a scrubbing element is inserted into one end of the pipe. The scrubbing element is advanced through the pipe while at the same time ejecting a cleaning fluid to clean the inside of the pipe section. The inner surface of the section is then scraped to remove materials adhering to the inside of the section which were not previously removed. The removed materials are then flushed from the inside of the section and the section is dried. The inside of the section is then painted by passing a painting device through the section which applies a mixture of paint and hardening liquid to the inside of the pipe. A device is also disclosed for coating the inner surface of a pipe which comprises a casing, an air motor and a cowling operatively connected to the motor for scattering coating liquid fed to the device. The apparatus may further comprise a mixing device for mixing coating liquids prior to applying them to the inner surface of the pipe.

13 Claims, 23 Drawing Figures

METHOD OF RENEWING WATER PIPE, INCLUDING COATING THEREOF, AND APPARATUS THEREFOR

BACKGROUND OF THE INVENTION

1. Field of the Invention

The present invention relates to a method of renewing water service pipe as well as to an apparatus used in carrying out a part of the method wherein a coating is applied to the inner surface of the water service pipe.

2. Description of the Prior Art

With years of use, rust, scales and other contaminants are generated and stick to the inner peripheral surface of pipes. This buildup effectively reduces the diameter of the pipe, resulting in increased flow resistance to the water flow with a consequent reduction of the flow rate as well as various inconveniences resulting from the reduced flow rate.

To overcome the above problems, it becomes necessary to periodically either replace the water supply pipe or renew the pipe by removing rust, scales and other contaminants attaching to the inner surface of the water service pipe. However, replacement of the water service pipe entails extensive long-term construction, as well as great expense to municipalities and, therefore, must be carefully planned.

For this reason, in most cases, effective yet simple renewal of pipes at relatively low cost would prove very useful.

Yet, even when pipes are renewed, it is very important that the renewal be completed in a short time period because the construction inherently necessitates a suspension of the water service supply, as well as the disruption of traffic around the site.

For these reasons, there is an increasing demand for the development of a method which can effect a perfect renewal of the water pipe quickly and which can prevent the recurrence of rusting, scaling and contamination of the inner surface of the pipe for many years, once the pipe has been treated.

SUMMARY OF THE INVENTION

It is, therefore, an object of the invention to reduce the period required for renewing water pipe.

It is another object of the invention to make it possible to thoroughly remove rust, scales, and other contaminants adhering to the inner surface of a water service pipe previously in use, so as to perfectly renew the latter.

It is yet another object of the invention to coat the inner surface of a previously constructed pipe which has been freed from rust, scale and other contaminants with an anti-rust synthetic resinous paint, so as to prevent the generation and adherance of rust, scales and contaminants to the inner wall of the pipe for a long time.

It is yet a further object of the invention to provide an apparatus capable of mixing a dual component synthetic resinous liquidus paint, which comprises a main liquid and a hardening liquid which harden rapidly, when mixed with each other immediately before application, by swiftly atomizing the mixed paint onto the inner surface of the pipe, thereby ensuring the formation of a thin and uniform coating of the paint on the latter.

It is another object of the invention to provide an apparatus capable of effectively mixing the main liquid and the hardening liquid of the dual component liquidus paint without employing electric driving power.

It is yet another object of the invention to provide a compact and a simple apparatus for coating the inner surface of a pipe, which affords easy removal of hardened residual paint attaching to the inside of the apparatus, and an easy cleaning of the inside of the pipe, as well as an easy inspection and replacement of the air motor at the site.

It is a further object of the invention to provide an apparatus, for coating the inner surface of the pipe, which can be inserted into and moved through even bent and curved pipes, so as to ensure a complete coating in a simple manner not only for straight pipes but for bent and curved pipes as well.

In fulfilling the above objects, a method of renewing a pipe section having fluid flowing therethrough has now been developed which comprises stopping the fluid flow through the said section. A scrubbing element is then inserted into one end of the section. This element is advanced from one end of the section to the other end thereof while it, at the same time, ejects a cleaning fluid from the scrubbing element to clean the inside of the section of materials adhering thereto. The section is then scraped to remove materials adhering to the inside of the section which were not removed by the scrubbing element. The materials removed during the scrubbing and scraping steps are flushed from the inside of the section and the section is dried by inducing a flow of air through the section. The inside of the section is painted by passing a painting device through the inside of the section to apply a mixture of paint and hardening liquid to the inside of the section.

In a preferred embodiment of the invention, the scrubbing element is a jet nozzle and the method of the invention comprises advancing the jet nozzle through the pipe by means of the reaction force generated when pressurized water is forced through the jet nozzle.

In yet another preferred embodiment of the invention the section is dried by creating a suction within the section to induce the flow of air therethrough. This suction is preferably created by providing a hollow suction pipe having an opening of diverging inner cross-section such that the suction pipe has an end of greater inner cross-section. The suction pipe further comprises means for introducing pressurized liquid around the periphery of the end of lesser cross-section. The end of greater inner cross-section is placed in fluid communication with the inside of the pipe section and pressurized liquid is passed past the end of lesser inner cross-section of the suction pipe to create a suction within the section.

A most preferred feature of the invention is the use of heated air to dry the pipe section.

The objects of the invention are further fulfilled by the apparatus of the invention which may be used to coat the inner surface of a pipe. The apparatus comprises: a casing; an air driven motor arranged within the casing; an air passage formed in the casing for introducing air into the casing to drive the motor; a cowling shaft projecting from a first end of the casing, the shaft being adapted to be rotated by the air driven motor; a cap shaped cowling having a base wall and a peripheral wall, said peripheral wall comprising a plurality of apertures, and cowling being attached to said cowling shaft to rotate with said shaft; a paint passage having an inlet and outlet, extending the length of said casing, said outlet opening onto said first end of said casing; and a paint nozzle connected to said end of said paint passage opening onto said first end of said casing to receive paint passing therethrough, said paint nozzle comprising at least one nozzle orifice facing and spaced from the interior of said peripheral wall of said cowling.

In a preferred embodiment, the apparatus further comprises a mixing device connected to the inlet portion of the paint passage. This mixing device is adapted to mix paint and hardening liquid fed to the device to form a mixture of the two prior to introducing the mixture into the paint passage.

DESCRIPTION OF THE PREFERRED EMBODIMENTS

To renew and clean a water service pipe, which has already been in use, the water supply to the water service area around the pipe to be renewed is first shut off. As may be seen from FIG. 1, the ground in which the water service pipe A is buried is then bored at intervals of about 100 m or the like, as illustrated at B, so as to expose the water service pipe A at each of the bores B. At each bore, a suitable length of the pipe such as 60 cm., for example, is cut away. As a result, the already-constructed water service pipe A is cut into sections, each having a length of about 100 m.

Lengths of 100 m for the pipe sections are not meant to be exclusive of other segment lengths, and the water service pipe A can be cut at intervals other than 100 m, depending on the piping arrangement, state of the road and other conditions.

After cutting the pipe A into sections of, for example, 100 m length as explained above, a guide roller 100 is attached to one end opening of the pipe section A which is to be renewed first. A scrubbing element 101 is then inserted into the pipe section A, guided by the guide roller 100.

Figure 6:
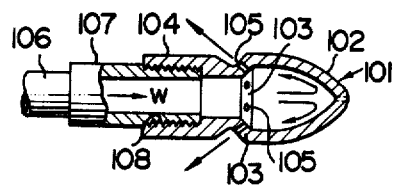
FIG. 6 is a longitudinal cross-sectional view of a scrubbing element used in FIG. 1.

As shown in FIG. 6, the scrubbing element 101 has a bullet-like head section 102 and a cylindrical body section 104 connected to the rear end portion of the head-section through a neck section 103. A suitable number of jet nozzle ports 105 are regularly distributed around the circumference of the neck section 103, and are directed obliquely rearwardly and radially outwardly relative to the front of the element. An adapter 107 fixed to the end of water supply tube 106 is screwed into the body section 104 of scrubbing element 101, thus connecting water supply tube 106 to scrubbing element 101.

When the size of the scrubbing element is relatively small, the screwing engagement of the adapter 107 and the body section 104 of the scrubbing element 101 is made in a manner as shown in FIG. 6, i.e., by direct engagement of these members through a thread formed on the outer periphery of adapter 107 with a thread formed on the inner periphery of the body section 104, as shown at 108.

The size of the scrubber body 101 will be a function of the diameter of the pipe A to be renewed. Thus, for the renewal of a pipe A having a large diameter, it will be necessary to use a large-sized and heavy scrubbing element. When a large-sized scrubbing element 101 is used, the connection between the body section 104 and the water supply tube 106 is made through the engagement of the adapter 107 at the end of the water supply tube 106 with an adapter nut which is itself rotatably secured to the body section 104 in a water-tight manner. In this arrangement, the scrubbing body 101 is attached to the water supply tube 106 by simply rotating the nut.

The water supply tube 106 is made of a material having the appropriate flexibility and strength, and is connected at its end to a water pressurizing apparatus C.

As pressurized water is supplied from the water pressurizing apparatus C, through the water supply tube 106, to the scrubbing element 101, the scrubbing element 101 is self-propelled by the reaction of the pressurized water being jetted obliquely rearwardly through the jet nozzle ports 105, and moves ahead through the pipe A. During the forward movement of the scrubbing body 101, incrustations, scales and other contaminants on the inner wall of the pipe A are parted from the latter, due to the pressure exerted by the body of the scrubbing element 101 which is itself moving ahead, and due to the violent jet of water being jetted from the nozzle ports 105. The freed rusts, scales and other contaminants are then washed or flushed away from the pipe A, by the rearward flow of the water.

The water pressurizing apparatus may be mounted on an automobile or like vehicle for easy movement, while the water supply pipe 106 is wound around a rotary drum 110 (FIG. 1) so that it unwinds with the forward movement of the scrubbing element 101.

The water to be supplied may be picked up from any suitable source closest to the site.

The scrubbing step performed by the scrubbing element may be carried out repeatedly, as required, depending on the extent of buildup and incrustation on the inside of pipe A. The scrubbing body 101 can be returned to the starting position by simply rewinding the rotary drum 110, and then restarting the process from that position.

Figure 1:
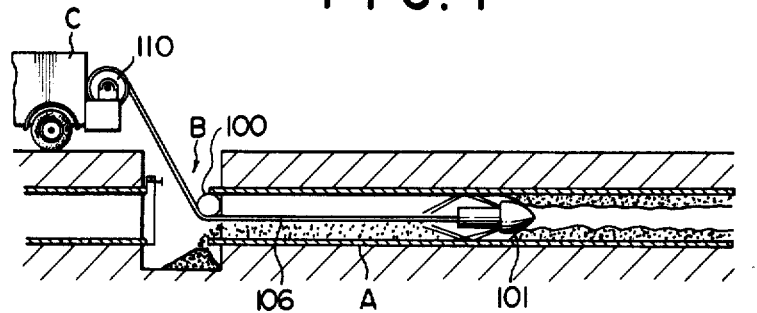
FIG. 1 illustrates scrubbing the inner surface of a pipe with the scrubbing element of the invention.

It will be seen that there is no damage to the pipe or joint by removed contaminants because the rust, scales and contaminants on the pipe wall are crushed into fine particles due to the impact pressure imparted by the scrubbing element and by the application of the jetted high pressure water, and are then conveniently washed away from the inside of the pipe A. The liquid may conveniently wash the removed materials into a ditch as illustrated in FIG. 1.

Additionally, since the scrubbing element is self-propelled through the pipe A by the reaction of the high pressure water jetted therefrom through the nozzle ports, it is not necessary to provide a specific means for moving the element such as a towing rope. Therefore, the work of inserting the towing means into the pipe and other associated works, which have in the past been necessary may be eliminated with the process of the invention, thus minimizing the time required for the scrubbing.

Although most of the rust, scales and other contaminants on the pipe wall may be removed by the foregoing scrubbing step, specific substances and strongly adhering materials may still remain along the pipe wall even after scrubbing. If the inner pipe wall is subsequently coated while these substances and materials remain on the pipe wall, these substances would soon cause peeling of the paint coating. Therefore, it is necessary to completely remove adhering materials in advance of the coating step.

Figure 2:
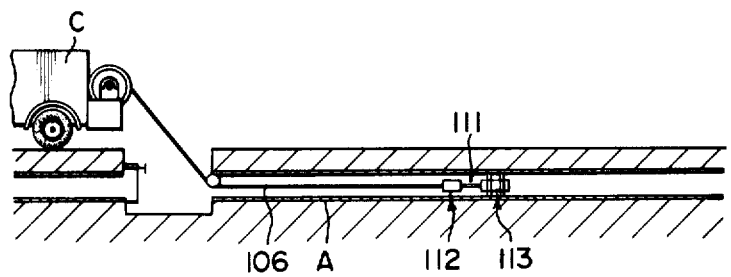
FIG. 2 illustrates scraping the inner surface of the pipe with a scraping element.

To this end, a scraping step may be performed subsequent to the above scrubbing step, to smooth the inner surface of the pipe, by scraping off residual substances and materials. This is done by towing and moving a scraping element 111 along the inner wall of the pipe as shown in FIG. 2.

Figure 7:
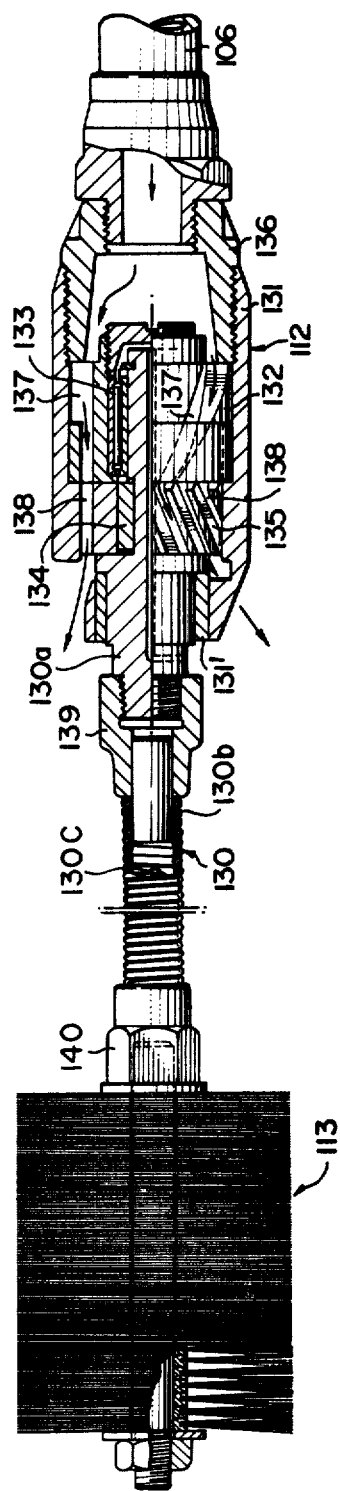
FIG. 7 is a partially cut-away side elevational view of a scraping body used in FIG. 2.

The scraping element 111 comprises a turbine 112 and a brush head 113 adapted to be rotated by the turbine 112. As shown in FIG. 7, the turbine 112 has a housing 131. A bearing 131 supports a rotor shaft 130a formed unitarily with the housing 131. A guide ring 132 for guiding the pressurized water is fixed to the inner periphery of the housing 131. The rotor shaft 130a is rotatably secured to the center of the guide ring 132 through a roller bearing 133. An impeller 135 is fixed to the rotor shaft 130a by means of a key 134, and is positioned just in front of the guide ring 132. The guide ring 132 is fixed to the housing 131 by means of a cap 136 which is screwed into the rear end portion of the housing 131.

A plurality of inclined grooves 137 are formed in the outer peripheral surface of the guide ring 132, for directing pressurized water which is introduced into the housing through the hose 106. On the other hand, a plurality of water receiving grooves 138 are formed to extend substantially at right angle to guide grooves 137.

Turbine shaft 130 comprises rotor shaft 130a carrying impeller 135 and, rotatably supported in the turbine 112, a flexible shaft 130b screwed to the end of the rotor shaft 130a and a rod 130c screwed to the end of flexible shaft 130b. Flexible shaft 130b comprises, for example, a coiled steel wire of appropriate length having nuts 139 and 140 welded to its two ends. Brush head 113 is detachably secured to rod 130c.

Figure 8:
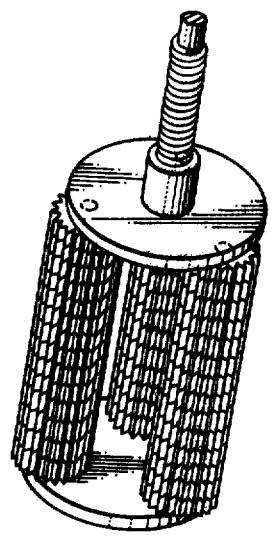
FIG. 8 is a perspective view of an alternative type of brush head for use instead of the scraping body shown in FIG. 7.

The brush head 113 may be a steel wire brush as shown in FIG. 7, or may comprise a governor blade as shown in FIG. 8, and has a diameter substantially equal to or slightly smaller than the diameter of the pipe to be renewed.

Once the scrubbing element 101 has been moved from the one end opening of the pipe section A where it was inserted to the other end of the pipe section, the scrubber element 101 is detached from the water supply tube 106, and the turbine 112 is then coupled to the adapter 107 of the water supply tube 106.

Then, while supplying highly pressurized water from the water pressurizer C to the water supply tube 106, the rotary drum 110 is rotated to retract the tube, thereby towing the scraping element 111 through the pipe section A. Consequently, the pressurized water supplied to the scraping element 111 through the water supply tube 106 causes the rotation of the turbine 112, to thereby rotatably drive the brush head 113 with contact of the latter with the inner peripheral wall of the pipe section A. Consequently, contaminants still sticking to the wall of the pipe section A are scraped and the wall surface is smoothed. The contaminants scraped off the wall are conveniently washed away by the water discharged into the pipe section A.

Subsequent to this scraping step, the scraping element 111 is detached from the water supply and the scrubbing element 101 may again be attached to water supply tube 106. The scrubbing element 101 is then self-driven and run along the inner wall of the pipe section A, as is the case of the aforementioned scrubbing step, so as to rinse the inside of the pipe section A and to completely wash away any residual contaminants.

Then, if necessary, the inner surface of the pipe section A is wiped and cleaned. This wiping can be carried out making use of a suitable cleaning means, such as a sponge, mop or the like.

Figure 3:
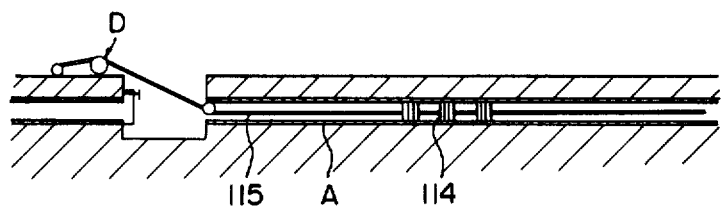
FIG. 3 illustrates cleaning the inner surface of the pipe with a mop.

Thus, when the scrubbing element 101 has reached the far end opening of the pipe section at the end of the rinsing step, the scrubbing element 101 may be detached from the water supply tube 106 and a mop 114 may then be connected to the latter instead. The water supply tube 106 is then retracted, while stopping the water supply, so as to pull the mop 114 along the wall of the pipe section A, to thereby wipe and clean the inner surface of the pipe section A. As shown in FIG. 3, the mop 114 is not secured to the water supply tube 106, but is secured instead to a wire rope 115 adapted to be pulled by a winch D. After completion of this wiping and cleaning step, the inner surface of the pipe has been substantially cleaned and no contaminants are left on the surface. The wiping and cleaning step is optional and may be dispensed with.

Where the wiping and cleaning step is carried out, the drying step is carried out with the wire rope 115 left in the pipe section A. To the contrary, when wiping and cleaning are not performed, a wire rope is connected to the scrubber body 101 which has been moved to the other end opening of the pipe section, so that the wire rope may extend through the latter.

In both cases, the drying step is performed with a wire rope left in and extending through the pipe section A.

Figure 4:
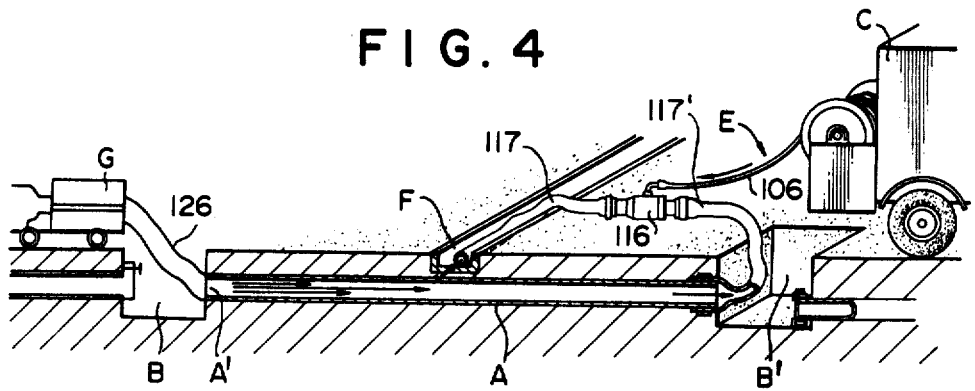
FIG. 4 illustrates air drying the inside of the pipe.

Drying is performed by an apparatus E illustrated in FIG. 4.

The apparatus E comprises flexible hose 117 having at its intermediate section a nozzle body 116 for jetting high pressure water, and a water pressurizer C connected to the nozzle body 116 through the water supply pipe 106 for supplying the nozzle body 116 with highly pressurized water.

The water pressurizer C and the water supply pipe 106 used in the previous step (FIG. 2) may be used as the pressurizer and the pipe in the drying step.

Figure 9:
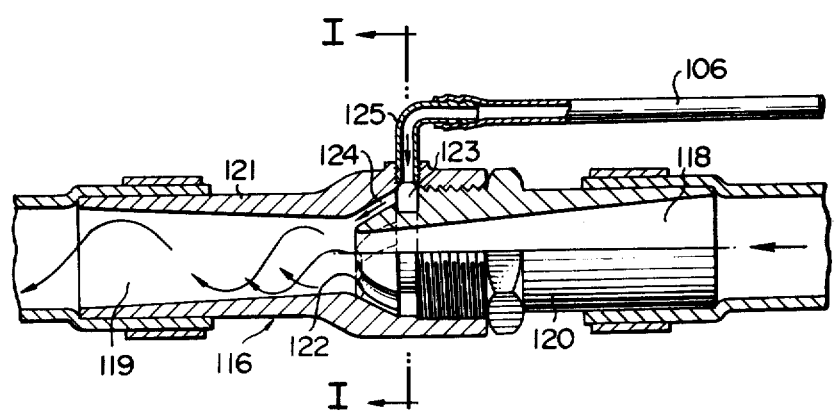
FIG. 9 is a longitudinal cross-sectional view of the device used in FIG. 4 to dry the pipe.

As will be seen from FIG. 9, the nozzle body 116 for jetting highly pressurized water comprises suction pipe 120, which may be made of metal provided with outwardly diverging passage 118 and having ends of lesser and greater inner cross-section, as well as a nozzle tube 121 screwed to the suction pipe 120 having a diverging cross-section 119. At the central portion of the nozzle body 116, a restriction 122 is provided which is surrounded by annular passage 123. The annular passage 123 communicates with the passage 119 formed in the nozzle tube 121 through a plurality of jet nozzle ports 124 which are suitably circumferentially distributed.

The water supply pipe 106 leading from the water pressurizer C is detachably connected to a connecting passage 125 which in turn communicates with the annular passage 123.

Figure 10:
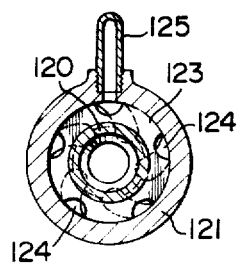
FIG. 10 is a cross-sectional view taken along the line I—I of FIG. 9.

The nozzle ports 124 are formed at an inclination to the axis of the passage 119 so that their extensions do not intersect at a point ahead of these nozzle ports (FIG. 10). Therefore, a rotary component of force is imparted to the water jetted from the nozzle ports 124 so as to increase the velocity of the water flowing in the passage 119, thereby obtaining a higher vacuum, i.e., sucking force at the suction pipe 120.

Flexible hoses 117' and 117 of suitable lengths are connected to the suction side end and the nozzle side end of the nozzle body 116 respectively.

As shown in FIG. 4, in use, hose 117' is connected to one end opening of the pipe section A in the bore B', while hose 117 is extended into a suitable water disposal line such as a gutter in the vicinity of the site. After connecting the water supply pipe 106, which may be the one which was used in the previous scrubbing step, to the connection pipe 125 of the nozzle body 116, highly pressurized water of about 250 Kg/cm² is fed into the annular passage 123 through the water supply pipe 106 and the connecting pipe 125.

The pressurized water forcibly fed to the annular passage is vigorously jetted from the passage 119 through the nozzle ports 125 such that a rotational component of force is imparted to the water thereby increasing its velocity. The jetted water is finally led to the end of the hose 117 and discharged therefrom. As the water flows through the passage 119 at a high velocity, a vacuum is generated in passages 118 and 119 of the nozzle body 116, so that air is violently induced through pipe section A (FIG. 4), flexible tube 117' and then through the suction pipe 120. Consequently, a flow of air is caused in the pipe section A, so as to fully evaporate the water and moisture adhering to the inner wall of the pipe section A.

The time required for the drying may be very substantially shortened by connecting the end of a hose 126 of an air heater G to the other end opening A' of the pipe section A, so as to feed hot air into the pipe section A as shown in FIG. 4. In this embodiment of the invention, it is not always necessary to connect the hose 126 of the air heater G to the pipe section A. Thus, a sufficient shortening of the drying time may be obtained simply by placing the end of the hose 126 in the bore B. Also it is to be noted that the use of the air heater G is not indispensable, and that drying can be completed in a reasonable period of time, by solely inducing ambient unheated air.

It is noteworthy that the time required for drying the inside of the pipe section is shortened by inducing air through the pipe section in the described manner. More specifically, by simultaneously feeding hot air to the bore B, by placing the end of the hose 126 of the air heater G in the bore B, and the induction of air by the operation of the apparatus E having the nozzle body 116, so as to forcibly induce the mixture of heated and unheated air through the pipe, the time required for completely drying the inside of the pipe which is usually about 2 hours can be shortened to about 10 to 15 minutes, when air having a temperature of about 20° C. to about 50° C. is used. In summer, when temperatures are warmer (about 30° C. or more) the air is already warm and supplemental heating is unnecessary.

Figure 5:
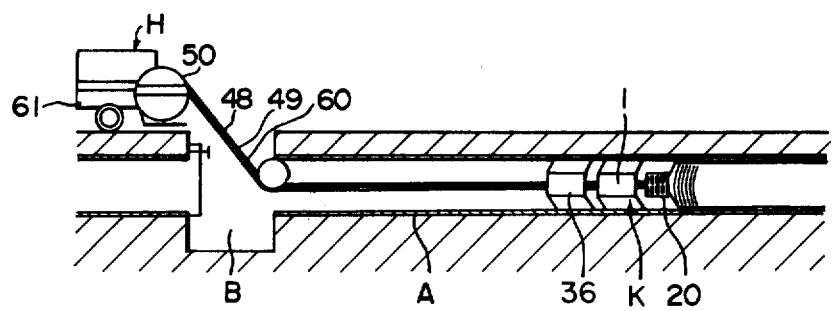
FIG. 5 illustrates coating the inside of the pipe with a paint mixture.

As may be seen from FIG. 5, after drying, the inner surface of the pipe section is next coated with an anti-rust plastic paint from a source H, to prevent renewed generation and adherence of rust, scales and other contaminants. Painting is performed with a painting device and a mixer 36.

The anti-rust plastic paint may advantageously comprise a mixture of a main liquid which is an epoxy resin and a hardening liquid. The liquids are atomized, after having been mixed with each other, and applied to the inner surface of the pipe section by means of a painting apparatus which will now be described.

Although a wide variety of paints and hardening materials may be used, the preferred paint composition comprises, by weight, about 90.0% epoxy resin, 9.9% titanium oxide, and 0.1% silica. The preferred hardening material comprises, by weight, about 60.0% modified amine adduct, 27.9% calcium carbonate, 12.0% barium sulfate, and 0.1% carbon black.

Figure 11:
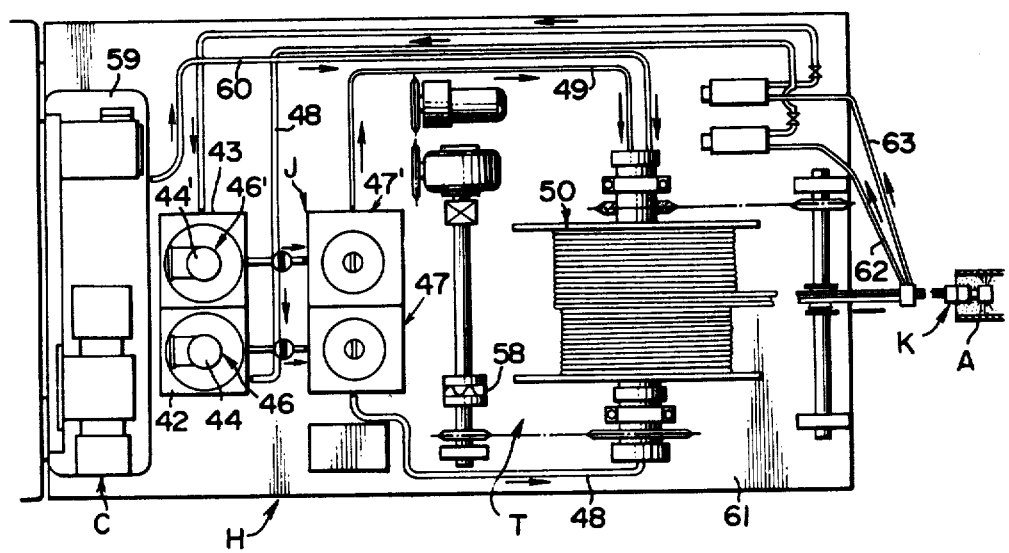
FIG. 11 is a top view of the painting apparatus shown in FIG. 5.
Figure 18:
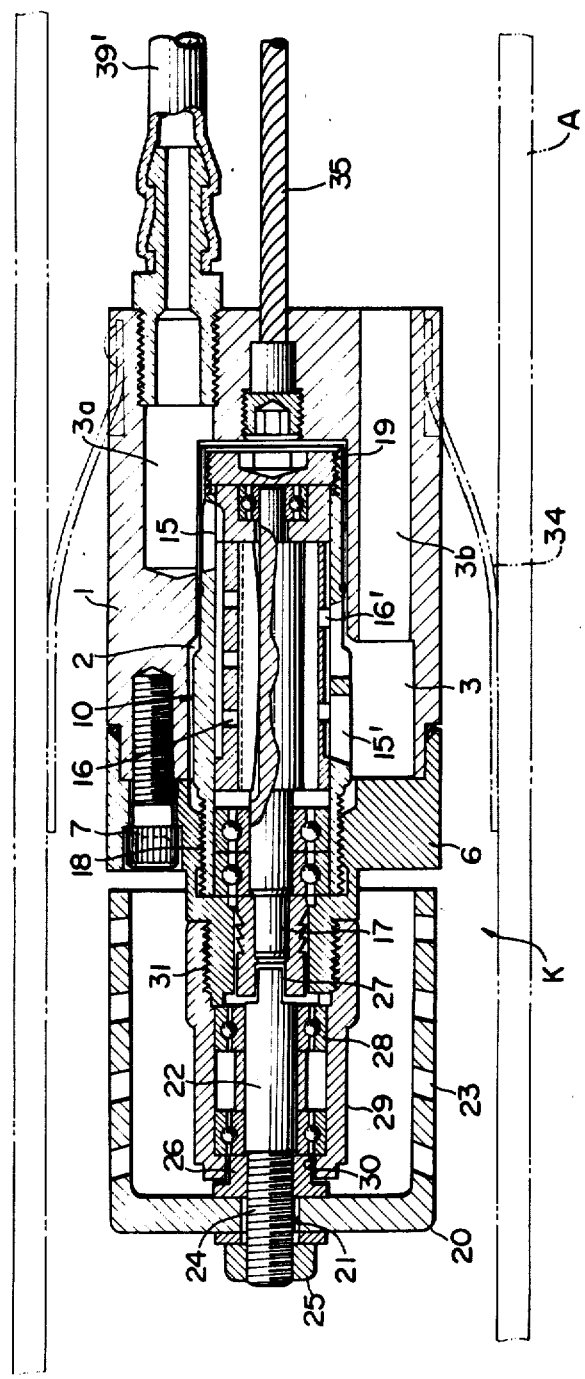
FIG. 18 is a sectional view taken along the line III—III of FIG. 17.

As shown in FIG. 11 the painting apparatus H has a painting device K comprising an air motor 10 (FIG. 18); a paint supply device J adapted to supply the painting device K with the paint, a pressurized air supplying device C adapted to supply the painter K with pressurized air, and a towing device adapted to tow the painting device K. The painting device K comprises a casing 1 of a small length and a small diameter (FIGS. 18 and 19).

Figure 20:
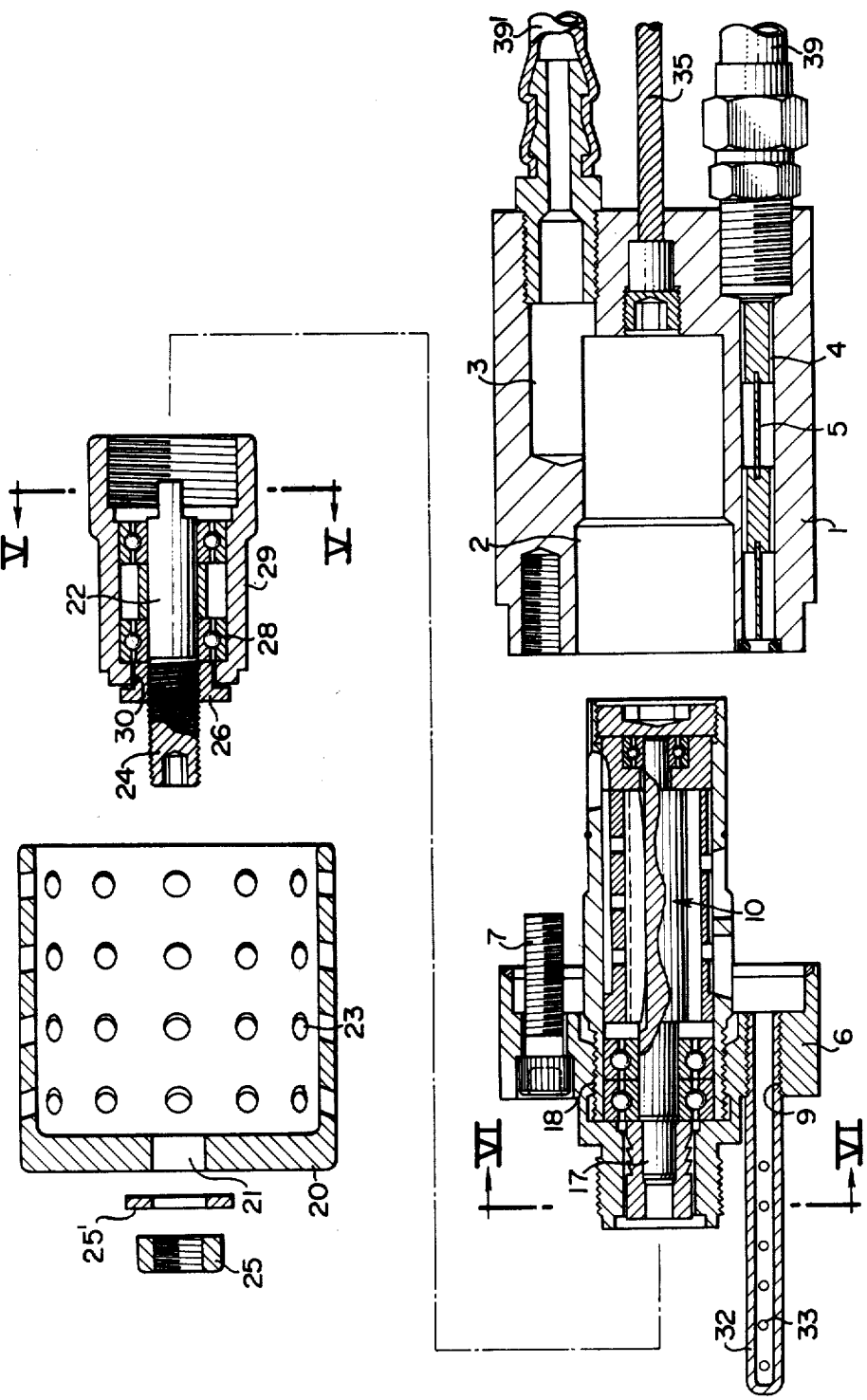
FIG. 20 is an exploded sectional view of the painting device in its disassembled state.
Figure 21:
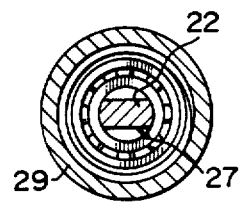
FIG. 21 is a sectional view taken along the line V—V of FIG. 20.

As may be seen from FIG. 20, a motor chamber 2 is formed at the center of the casing 1, so as to open in the front wall of the latter. The motor chamber 2 has an inlet and an outlet both of which are in communication with a passage 3 for pressurized air, which is formed to open into the rear wall of the casing 1.

Figure 17:
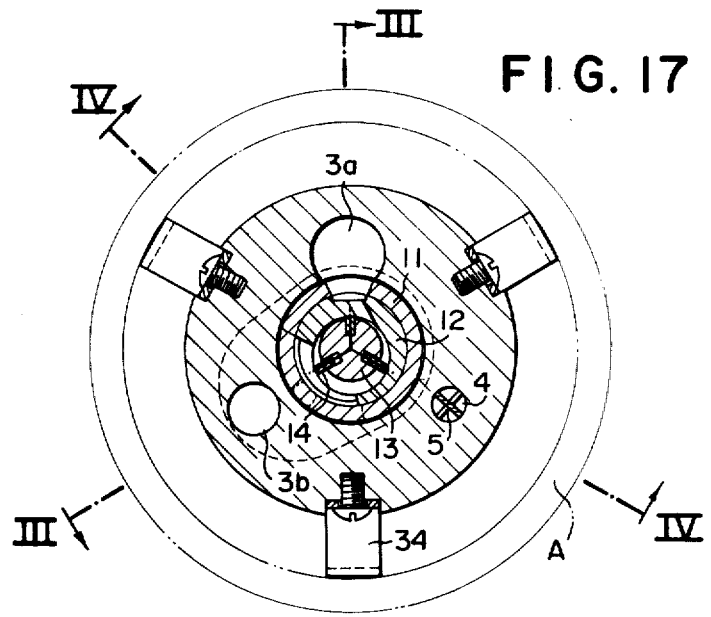
FIG. 17 is an enlarged cross-sectional view taken along the line II—II of FIG. 14.

A paint passage 4 is formed in the casing 1 to extend axially through the latter. The paint passage 4 is provided therein with a stirring element 5 which comprises a plurality of plate-like pieces arranged in series in a staggered manner such that the front edge of a piece lies at a predetermined angle to the rear edge of the adjacent piece (FIG. 17).

Figure 14:
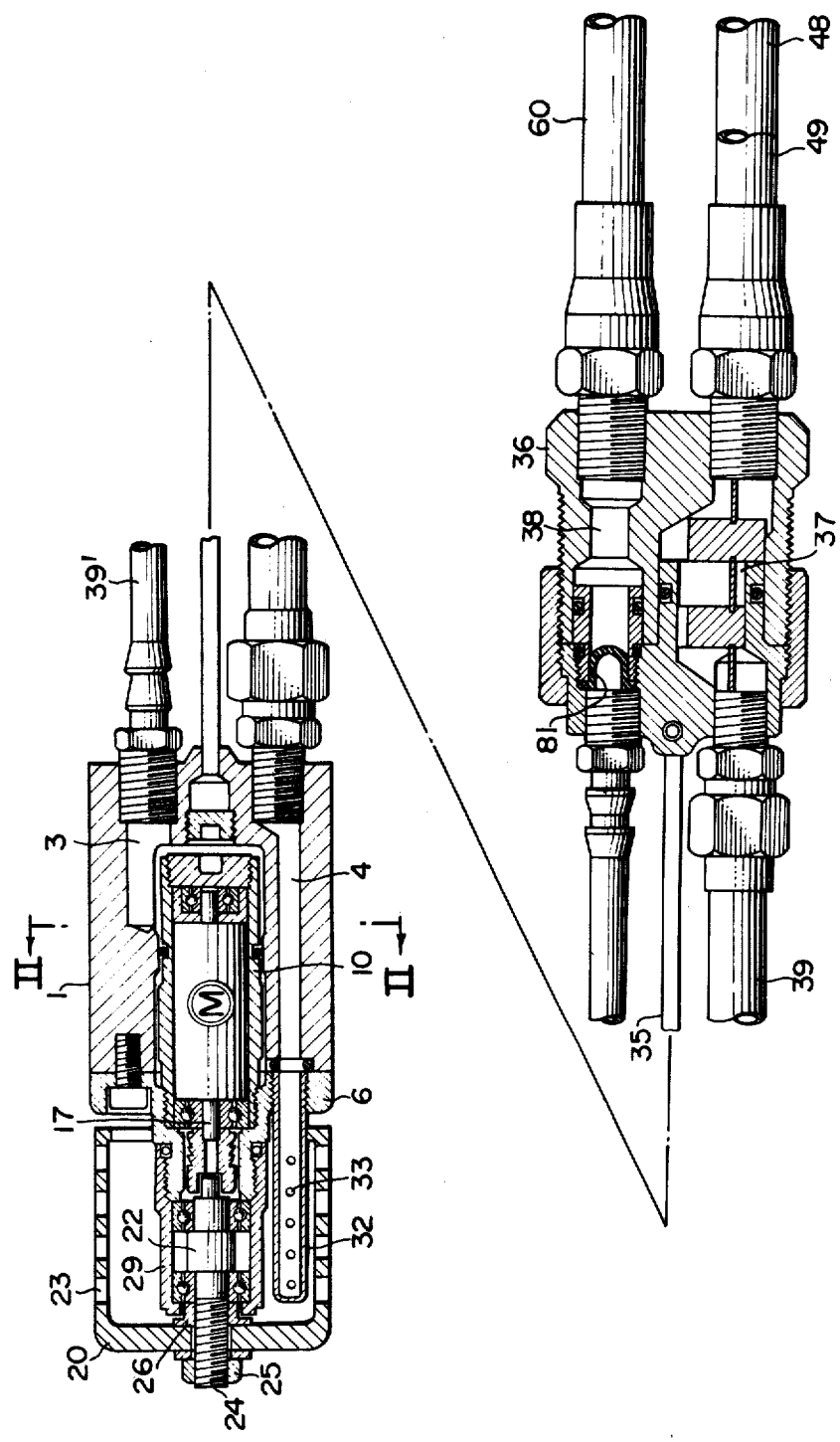
FIG. 14 is a side view of a painting device shown in FIG. 11, with its housing portion in cross-section.
Figure 19:
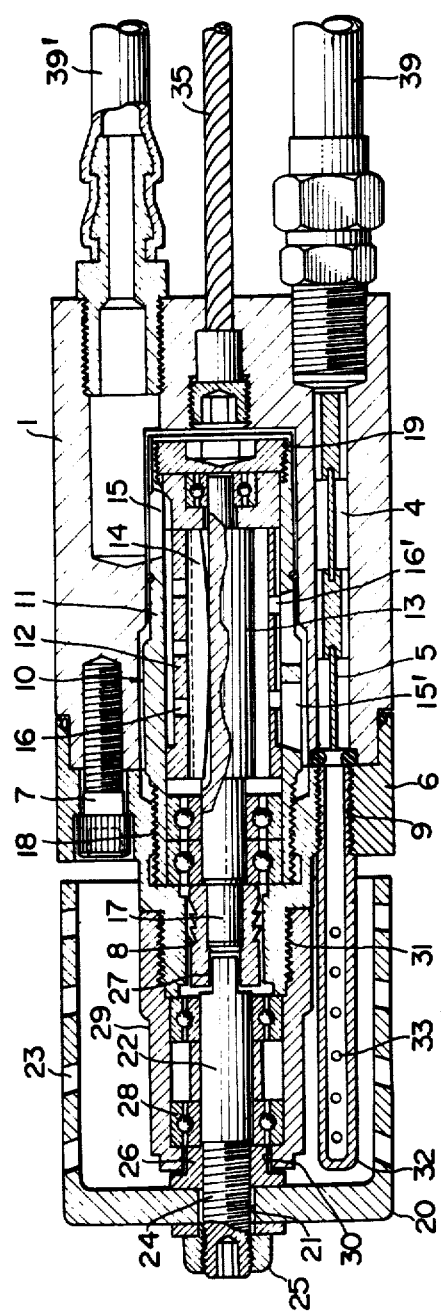
FIG. 19 is a sectional view taken along the line IV—IV of FIG. 17.

As seen from FIG. 14, a mixing case 36 is connected to the rear end of the casing 1, through a flexible wire 35, while a cover 6 is fastened to the front side of the casing 1 by means of screws 7 (FIG. 19).

Figure 22:
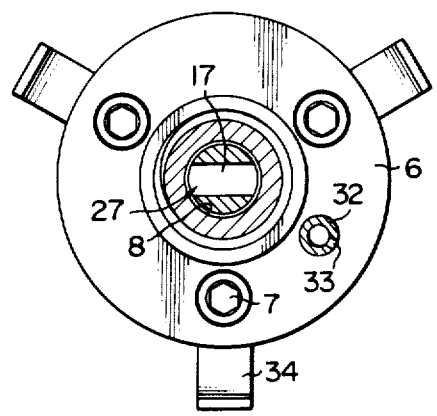
FIG. 22 is a cross-sectional view along the line VI—VI of FIG. 20.
Figure 23:
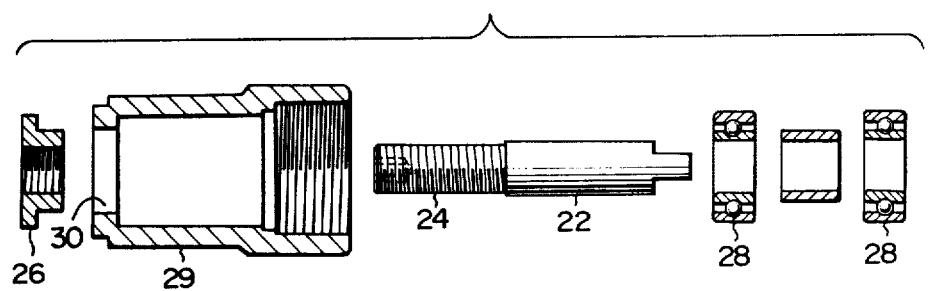
FIG. 23 is an longitudinal cross-sectional view of a bearing and a portion surrounding the bearing and the cowling shaft of the painting device arranged for assembly.

FIG. 22 illustrates that the cover 6 has a bore 8 formed coaxially with the motor chamber to receive the rotary shaft, as well as a nozzle connection port 9 (FIG. 20) which is formed coaxially with the paint passage 4.

A mixing chamber 37 is formed in the mixing case 36. The mixing chamber 37 has an inlet port opening in the rear wall of the mixing case 36 and an outlet port opening in the front wall of the mixing case 36. Besides the mixing chamber, a passage 38 for pressurized air is formed to extend axially through the mixing case 36. The outlet port of the mixing chamber 37 is connected to the inlet port of the paint passage 4 of the casing 1, while the outlet port of the passage 38 for pressurized air is connected to the inlet port of the passage 3 for pressurized air of the casing 1, respectively, through flexible tubes 39 and 39'.

Figure 15:
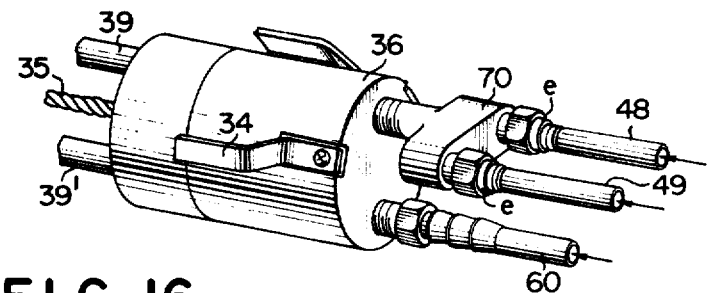
FIG. 15 illustrates a mixing device for the painting apparatus.

The mixing chamber 37 is formed to have a diameter much larger than those of the inlet and outlet ports. Stirring elements (not shown) similar to that disposed in the paint passage 4 of the casing 1 are provided in the inlet and outlet passages of the mixing chamber 37. A tridentate or "Y" coupling 70 (FIG. 15) is screwed at its one end into the inlet port of the mixing chamber 37 of the mixing case 36. The other two ends of the "Y" coupling 70 are connected to a main liquid supply pipe 48 and a hardening liquid supply pipe 49, respectively, of the paint supply device. At the same time, the inlet port of the passage 38 for pressurized air is connected to the end of a hose 60 of the pressurized air supplying device C (FIG. 11). These connections are made through respective joints M which are designed to allow disconnection in a simple manner.

Figure 16:
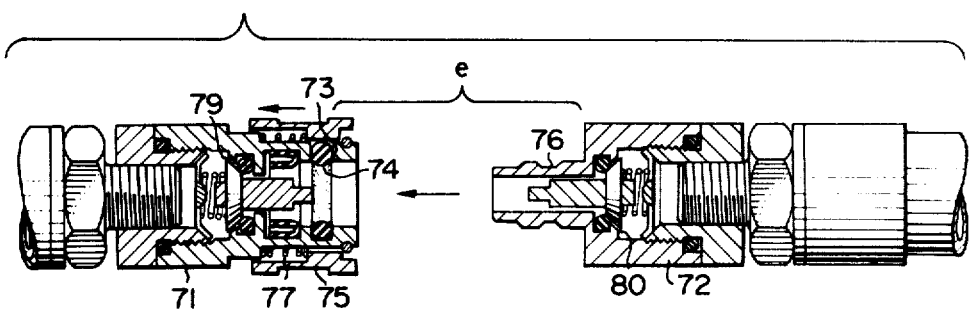
FIG. 16 is a longitudinal cross-sectional view of a connector coupling.

More specifically, as shown in FIG. 16 the joints M comprise female members 71 and male members 72. The female members 71 of these joints are secured to the two end openings of the tridentate coupling or "Y" connector 70 which is screwed into the mixing case 36, as well as to the inlet port of the pressurized air passage 60 of the mixing case 38. The male members 72 of the joints M are secured to the main liquid supply pipe 48 and the hardening liquid supply pipe 49 of the paint supply device J, as well as to the air hose 60 of the pressurized air supply device C. The mixing case 36 is connected to the paint supply device J and to the pressurized air supply device C, by inserting the male members 72 into the corresponding female members 71.

Bores 73 are formed in the periphery of the female member 71, so as to receive rings 74. As the rings 74 are pressed by a press ring 75, they move radially inwardly to project from the inner peripheral wall of the female member 71, and become fitted in a groove 76 formed on the outer periphery of the male member 72, thereby securing the male and the female members to each other.

The press ring 75 has an annular shape, and is fitted around the female member 71 so that it is free to move in the axial direction relative to the latter. The press ring 75 is normally biased by means of a spring 77 to a position where it presses the rings 74 into the groove 76 of the male member 72. To disconnect the male and the female members (72, 71) from each other, the press ring 75 is simply displaced in the axial direction, against the force of the spring 77, so as to free the ring 74 from the groove 76.

Valves 79 and 80 are arranged in the female and male members 71 and 72 respectively. These valves are adapted to open when the female and male members 71 and 72 are coupled with each other, and to close when the members are disconnected from one another.

As illustrated in FIGS. 18 and 19 an air motor 10 housed in the motor chamber 2 of the casing 1 has a cylinder 12, a rotor 13, and blades 14. The air motor 10, when arranged in the motor chamber 2, divides the pressurized air passage 3 into a suction side section 3a and an exhaust side section 3b. The pressurized air introduced into the passage 3 is caused to flow through the cylinder casing 11 of the air motor 10 and ventilation ports 15, 15', 16, 16' of the cylinder 12, toward the outlet port, so as to be exhausted from the latter. The air flowing in the described manner collides with the blades 14, so as to impart a torque to the latter, thereby causing high speed rotation of the motor shaft 17 of the rotor.

Use of an air motor 10 as the driving means is preferred to use of complicated accessories and members such as electric wirings and is less troublesome to operate. Furthermore, the adoption of the air motor contributes, in combination with the separate arrangement of the mixing device from the casing, to minimizing the size of the painting device K. This effect of minimizing the size of the painting device K provides a remarkable advantage, because it affords smooth passage of the painting device even through the bent and curved portion of the pipe.

The motor shaft 17 extends into the bore 8 formed in the cover 6 of the casing 1. The air motor 10 is screwed to the cover 6 and to the bottom of the motor chamber, at portions 18 and 19, respectively. Therefore, the air motor 10 can be dismounted from the motor chamber 2, by removing the screws 7 and then unscrewing the air motor at portions 18 and 19.

Thus, when the motor is found to malfunction in any way during testing it may be easily and swiftly replaced with a spare motor. Consequently, the pipe renewal work is entirely free of problems relating to the time consuming repair and replacement of the motor, as well as failures attributable to trouble with the air motor in the course of renewing the pipe. This, of course, ensures faster renewal of the pipe as well as easier maintanence of the motor after the work.

FIGS. 18 and 19 further illustrate a cowling 20 having a peripheral wall and a bottom wall. A shaft-receiving bore 21 is formed at the center of the bottom wall and the cowling shaft 22 is inserted in this bore and fixed thereto. A number of small apertures 23 are uniformly distributed and formed in the peripheral wall of the cowling 20. The end of the cowling shaft is threaded at 24 and is engaged by two nuts 25 and 26 so as to cramp the bottom of the cowling 20 therebetween, thereby fixing the cowling shaft 22 to the cowling 20.

The cowling shaft 22 is connected at its rear end to the motor shaft 17 of the air motor 10. Both shafts 17 and 22 are provided with clutches 27 which engage with a grooved sleeve 27'.

Turning now to FIGS. 20 to 23, a bearing 28 is press-fitted to an intermediate portion of the cowling shaft 22, through which the latter is rotatably carried by a support sleeve 29 which also plays the role of a cover. A nut 26 located at the inside of the cowling 20 is received by a bore 30 in the support sleeve 29. The support sleeve 29 is screwed to the cover 6 at a portion 31 (FIG. 19). Therefore, the cowling shaft 22 can easily be taken apart by first removing the nut 25 and the washer 25', removing the cowling 20, and then unscrewing the support sleeve 29 from the cover 6.

This arrangement allows the simple removal of any paint which has penetrated the inside of the painting device during the operation of the latter and hardened onto the wall of the same, after the use of the device.

A spraying nozzle 32 comprises a closed small pipe having a plurality of nozzle orifices 33 in its wall, arranged in a row extending in the axial direction of the small pipe (FIG. 19). The spraying nozzle 32 is screwed at its base portion to a nozzle attaching bore 9 of the cover 6 of the casing, so that it extends into the cowling 20. The nozzle orifices 33 are preferably oriented so as to face in the general direction of rotation of the peripheral wall of the cowling 20, although they are spaced from the inner peripheral wall. By orienting the orifices 33 so that paint is thrown out in a direction which coincides with the rotation of the cowling, the paint is sprayed over the entire inner surface of the pipe.

As seen in FIG. 18, a support system 34 comprising at least three resilient legs is secured to the outer peripheral surfaces of the casing 1 and the mixing casing 36, evenly spaced along the circumference of the casing. Each resilient leg is secured at its rear end to the rear end portion of the casing 1, while the front end thereof extends obliquely outwardly toward the front side end of the casing 1. The angle of divergence of all the resilient legs is preferably equal.

In the above embodiment, the painting device K has a mixing device comprising a mixing case 36 having an inner mixing chamber 37 designed for a better mixing of the main liquid and the hardening liquid with each other. Instead of the above stated mixing device, it is also possible to use another type of mixing arrangement (not shown) comprising a flexible tube of a suitable length having stirring elements therein. In the latter case, one end of the flexible tube is connected to the inlet port of the paint passage of the casing, while the other end of the flexible tube is connected to the outlet of a tridentate coupling fed by two separate inlets. Needless to say, in this embodiment the wire rope for connecting the casing to the mixing device may be dispensed with, and the air hose of the pressurized air supplying device may be directly connected to the inlet port of the pressurized air passage of the casing.

Furthermore, the pressurized air passage 3 of the casing 1 or passage 38 of the mixing case 36 of the painting device K is preferably provided with a cleaning means 81 such as an air filter. Such a cleaning means is effective not only for removing fine dust and other contaminants suspended in the pressurized air so as to protect the air motor 10 from these dusts and contaminants, but also for preventing attachment of dust and contaminants, which are carried by the air exhausted from the air motor 10, onto the unpainted inner wall of the pipe section A, thereby eliminating a cause of early peeling of the paint.

In the embodiment illustrated in FIG. 14, the cleaning means 81 is located in the vicinity of the outlet port of the pressurized air passage 38 of the mising case. However, as was pointed out above, this is not the only possible location of the cleaning means 81, and the cleaning means 81 may instead be arranged in the pressurized air passage 3 of the casing 1, as well as at the suction side of the same.

The cleaning device provided at the exhaust side would be effective to take up the oil content which has been blown off from the air motor 10, thus ensuring secure adherance of the paint onto the inner surface of the pipe section A.

Figure 13:
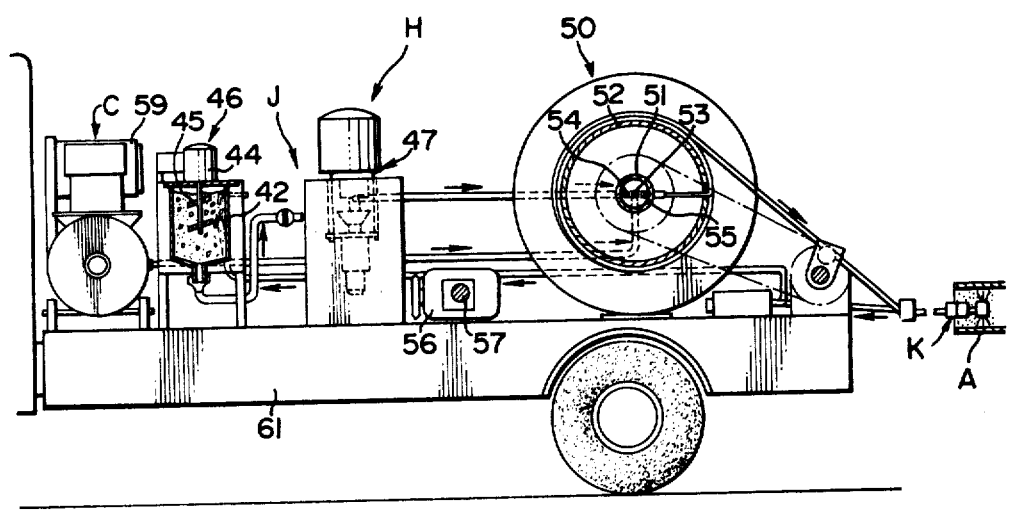
FIG. 13 is a partially cut-away side elevational view of the apparatus shown in FIG. 11.
Figure 12:
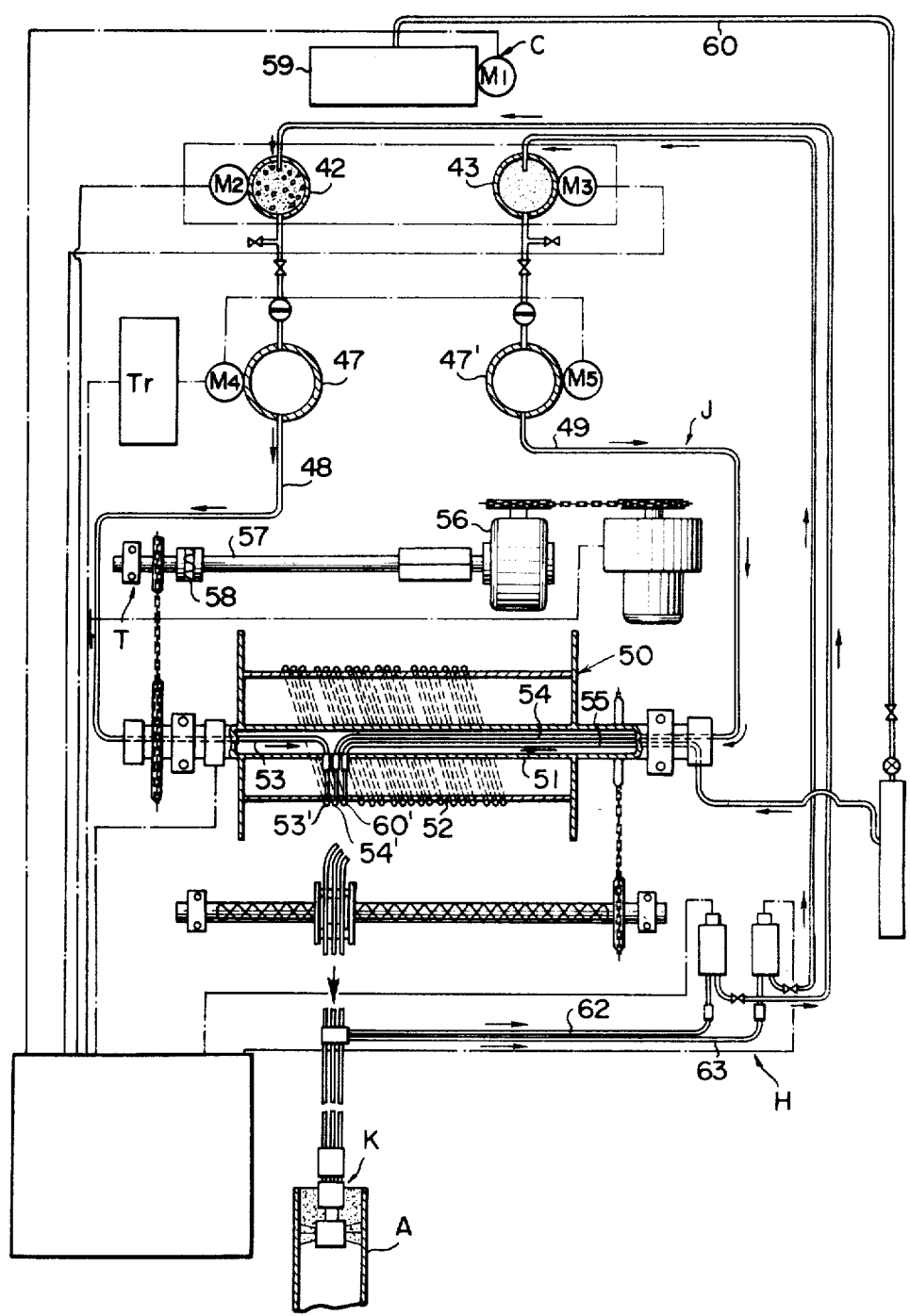
FIG. 12 is a partially cut-away enlarged top view of the painting apparatus shown in FIG. 11.

Reference is now made to FIGS. 11 to 13, showing the paint supply device C.

The paint used in the process of the invention is a bicomponent liquidus synthetic resinous paint comprising a main paint liquid and a hardening liquid which hardens when the two liquids are mixed with each other. The main liquid and the hardening liquid are reserved in separate liquid tanks 42 and 43, respectively. The liquid tanks 42 and 43 are provided with stirring means 46 and 46', respectively. In each case the stirring means comprise a stirring blade (only blade 45 is shown) adapted to be driven by a motor (44 for tank 42 and 44' for tank 43). The main liquid and the hardening liquid are sucked from respective liquid tanks 42 and 43 by airless pumps 47 and 47', respectively and fed to respective paint supplying pipes 48 and 49 which are flexible hoses connected at their one end to the liquid tanks 42 and 43 through the airless pumps 47 and 47' and at their other ends to the painting device K.

A rotary drum 50 is interposed at intermediate portions of the paint supplying pipes 48 and 49. More specifically, as shown in FIG. 13, the rotary drum 50 has a hollow shaft 51. From respective ends of the shaft 51, and extending through the latter are paint tubes 53 and 54. These paint tubes lead up to the peripheral surface of a drum body portion 52 (FIG. 12). At the same time, an air tube 55 is extended through one end of the shaft 51 and then through the latter, so as to lead up to the periphery of the drum body portion 52. The paint supply pipes 53' and 54' are connected to the paint tubes 53 and 54 which are wound around the drum body portion 52. The shaft 51 of the rotary drum 50 is rotatably supported by bearings, so that the rotary drum 50 can be freely rotated as the paint supply pipes 53' and 54' are pulled, to thereby optionally pay off the paint supply pipes 53' and 54'.

The above mentioned shaft 51 is associated with a shaft 57 which is adapted to be driven by a motor 56, so as to rotate in response to the rotation of the shaft 57. This arrangement constitutes towing means T for towing the painting device K. Rotation of the rotary drum 50 caused by actuation of the motor 56 occurs in a direction which retracts or rewinds the paint supply pipes 53' and 54'.

A clutch mechanism 58 interposed between the shaft 51 of the rotary drum 50 and the shaft 57 is adapted to disengage the shaft 51 from the shaft 57, when the rotary drum is rotated so as to pay off the wound supply pipes.

The pressurized air supply device C comprises an air compressor 59 and an air hose 60 connected to the compressor. The air hose 60' is wound around the rotary drum 50 along its intermediate portion, as is the case of the paint supply pipes 53' and 54'. Namely, the air tube 55 in the shaft 51 of the rotary drum 50 is interposed in the intermediate portion of the air hose 60. The paint supply device J, pressurized air supplying device C and the towing device T are all mounted on a vehicle 61 (FIG. 11), for easy transportation to and installation at the destined site.

In FIGS. 11 and 12, reference numerals 62 and 63 denote hoses for recirculating the main liquid and the hardening liquid for maintaining the flowing condition of these liquids even when they are not being supplied to the painting device K. As illustrated in FIG. 16, female members 71 are capable of engaging the male members 72 of joints M secured to the paint supply pipes 53' and 54'. Immediately after the completion of the painting, the painting device K is detached from the paint supply pipes 53' and 54', and the recirculation hoses 62 and 63 are connected to the paint supply pipes 53' and 54' instead.

Since the recirculation hoses 62,63 are connected to the liquid tanks 42,43, the main liquid and the hardening liquid are kept in the flowing condition.

The coating of the inner surface of a pipe section A is carried out by means of painting apparatus H in the following manner.

At first, the painting device K is connected to the end of the wire rope which has been previously passed through the pipe section A. As the wire rope is pulled, the painting device K is brought to the other end opening of the pipe section A. The painting device K is thus placed at the other end opening of the pipe section A, with its cowling 20 directed toward the opening. Then, the wire rope is disconnected from the painting device K.

Then, simultaneously with a supply of pressurized air from the pressurized air supplying device C, the main and hardening liquids are fed under pressure to the painting device K.

Consequently, the main and hardening liquids are mixed with each other and sprayed from the spray nozzle 32. At the same time, the air motor 10 which is energized by the pressurized air rotates the cowling 20 at high speed.

Paint sprayed from the spray nozzle is atomized through the small apertures 23 of the cowling. The centrifugal force caused by the high speed rotation of the cowling 20 scatters the paint onto the inner surface of the pipe section A. During this atomization of the paint, the painting device K is moved along the wall of the pipe section A, by means of the towing means T. As a result, the painting device K is gradually moved back to the end of the pipe section A through which it has been inserted into the pipe section A, by rewinding the paint supply pipes 53' and 54' as well as the air hose 60' by rotation of the rotary drum 50 in a direction which rewinds the pipes. The inner surface of the pipe section A is coated with the paint, in the course of the return movement of the painting device K. Thus, when the travel of the painting device K from one to the other end of the pipe section A has been completed, the entire inner surface of the pipe section A will be coated with anti-rust synthetic resinous paint.

As a result of the improved coating of the inner surface of the pipe which occurs during the painting step, the repeated generation of rust, scales and the attachment of other contaminants to the inner wall of the pipe section A is prevented for a longer period, thereby extending the life of the pipe which results in substantially less maintenance and a longer useful life. These results will be of great benefit to municipalities which are routinely faced with overhauling their existing piping systems.

After the coating has completely dried, the cut out pipe section A is suitably connected to the adjacent pipe section, and the bore B is refilled, to complete the renewal of the water service pipe in accordance with the method of the invention. The drying of the coating may be performed in the same way as that performed for drying the inner surface of the pipe after the rinsing step. It will be seen that, when the drying method described for the drying subsequent to the rinsing is applied to the drying of the coating, the drying time can conveniently be shortened by more than several hours.

Although the method and apparatus of the invention has been described with reference to particular scrubbers, scrapers, process materials and the like, it is to be understood that the scope of the invention should not be construed as being limited only to what has been specifically disclosed. Instead, the invention is limited only by the scope of the claims.

I claim:

1. An apparatus for coating the inner surface of a pipe comprising:
   (a) a casing;
   (b) an air driven motor arranged within said casing;
   (c) an air passage formed in said casing for introducing air into said casing to drive said motor;
   (d) a cowling shaft projecting from a first end of said casing, said shaft being adapted to be rotated by said motor;
   (e) a cap-shaped cowling having a base wall and a peripheral wall, said peripheral wall comprising a plurality of apertures, said cowling being attached to said cowling shaft to rotate with said shaft;
   (f) a paint passage, having an inlet and outlet, extending the length of said casing, said outlet opening onto said first end of said casing; and
   (g) a paint nozzle connected to said end of said paint passage opening onto said first end of said casing to receive paint passing therethrough, said paint nozzle comprising at least one nozzle orifice facing and spaced from the interior of said peripheral wall of said cowling.

2. The apparatus as defined by claim 1, further comprising a support system having at least three resilient legs attached to said casing to support said casing when said casing is advanced through said pipe such that it advances coaxially through said pipe and so that it is uniformly spaced from said pipe.

3. The apparatus as defined by claim 1, wherein said air driven motor is removably mounted within said casing.

4. The apparatus as defined by claim 1, wherein said cowling is removably secured to said cowling shaft.

5. The apparatus as defined in claim 4, wherein said air driven motor comprises a motor shaft for rotating said cowling shaft and said motor and cowling shafts are releasably associated with one another.

6. The apparatus as defined in claim 1, further comprising a mixing device connected to said inlet of said paint passage, said mixing device being adapted to mix paint and hardening liquid fed to said device to form a mixture and then introduce said mixture into said paint passage.

7. The apparatus as defined by claim 6, wherein said mixing device comprises:
   (a) a mixing case,
   (b) a mixing chamber within said case;
   (c) a first inlet means for feeding a paint material into said mixing chamber; and
   (d) a second inlet means for feeding a hardening liquid into said mixing chamber;
   (e) an outlet means for withdrawing the liquids fed to said mixing chamber from said chamber, said outlet means being connected to said paint passage.

8. The apparatus as defined by claim 7, wherein said mixing device further comprises a pressurized air passage, an air inlet for introducing pressurized gas into said passage and a gas outlet for withdrawing said pressurized gas from said passage.

9. The apparatus as defined by claim 8, wherein said first and second inlet means comprise the first and second branches respectively of a three branch "Y" coupling, and the third branch of said coupling is connected to said mixing chamber to introduce said paint and said hardening liquid into said mixing chamber.

10. The apparatus as defined by claim 6, wherein said mixing device comprises a flexible tube having a first and second end, said first end being connected to said paint passage for introducing said paint and hardening liquid into said paint passage and said second end of said flexible tube is connected to a "Y" coupling into which said paint and said hardening liquid are fed, and wherein said flexible tube comprises stirring elements therein for mixing said paint and said hardening liquid.

11. The apparatus as defined by claim 6, wherein said paint passage comprises stirring elements for mixing paint and hardening liquid introduced into said paint passage.

12. The apparatus as defined by claim 7, wherein said mixing device comprises a support system having resilient legs attached to the outside of said mixing case such that when said mixing device is inserted and advanced in said pipe it travels coaxially through said pipe maintaining a gap between the walls of said mixing casing and the inner surface of said pipe.

13. The apparatus as defined by claim 7, wherein said mixing case is flexibly connected to said casing so as to leave a gap between said case and said casing.

* * * * *